United States Patent
Mukai (10) Patent No.: US 12,115,651 B2
(45) Date of Patent: Oct. 15, 2024

(54) CONTROL DEVICE FOR INDUSTRIAL ROBOT

(71) Applicant: NIDEC SANKYO CORPORATION, Nagano (JP)

(72) Inventor: Kokyu Mukai, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 475 days.

(21) Appl. No.: 17/519,547

(22) Filed: Nov. 4, 2021

(65) Prior Publication Data
US 2022/0143839 A1     May 12, 2022

(30) Foreign Application Priority Data

Nov. 9, 2020   (JP) ................................ 2020-186501

(51) Int. Cl.
    *B25J 13/00*      (2006.01)
    *B25J 19/06*      (2006.01)
    *H05K 5/00*      (2006.01)

(52) U.S. Cl.
CPC ............... *B25J 13/00* (2013.01); *B25J 19/06* (2013.01); *H05K 5/0017* (2013.01)

(58) Field of Classification Search
CPC .......... B25J 13/00; B25J 19/06; H05K 5/0017
See application file for complete search history.

(56) References Cited

U.S. PATENT DOCUMENTS

| | | | |
|---|---|---|---|
| 5,903,123 A | 5/1999 | Shimogama | |
| 7,501,778 B2 | 3/2009 | Hashimoto et al. | |
| 7,525,273 B2 | 4/2009 | Hashimoto et al. | |
| 8,237,389 B2 * | 8/2012 | Fitch | B25J 13/06 318/563 |
| 10,022,879 B2 | 7/2018 | Liang et al. | |

(Continued)

FOREIGN PATENT DOCUMENTS

| | | |
|---|---|---|
| CN | 1994692 | 7/2007 |
| CN | 101168255 | 4/2008 |

(Continued)

OTHER PUBLICATIONS

"Office Action of Taiwan Counterpart Application" with English translation thereof, issued on May 25, 2022, p. 1-p. 15.

(Continued)

*Primary Examiner* — Jaime Figueroa
*Assistant Examiner* — Zachary Joseph Wallace
(74) *Attorney, Agent, or Firm* — JCIPRNET (57) ABSTRACT

A control device for an industrial robot includes a plurality of types of safety devices capable of connecting with the control device and connected with a power source in series, and the safety device is configured to be capable of being manually switched between electric cutoff of a wiring path and resumption from the cutoff. The control device further includes detection circuits connected with respective output side terminals of the plurality of the types of the safety devices, and each of the detection circuits detects whether the output side terminal is in a first state that power is supplied from the power source or in a second state that power supply from the power source is stopped, and the control device further includes a control part configured to perform notification based on an output of the detection circuit.

8 Claims, 4 Drawing Sheets

(56) References Cited

U.S. PATENT DOCUMENTS

| | | | |
|---|---|---|---|
| 2001/0027352 A1 | 10/2001 | Morita et al. | |
| 2009/0058342 A1 | 3/2009 | Nihei et al. | |
| 2010/0288067 A1* | 11/2010 | Hofmann | B25J 9/1674 |
| | | | 74/490.03 |
| 2012/0114348 A1 | 5/2012 | Suzuki et al. | |
| 2017/0182662 A1* | 6/2017 | Huang | B25J 19/026 |
| 2017/0210017 A1* | 7/2017 | Yamamoto | B25J 9/1674 |
| 2018/0311836 A1* | 11/2018 | Muneto | B25J 13/085 |
| 2019/0306029 A1* | 10/2019 | Kawaharada | G05B 19/4185 |
| 2019/0340909 A1* | 11/2019 | Nguyen | B25J 9/1676 |

FOREIGN PATENT DOCUMENTS

| | | |
|---|---|---|
| CN | 101376249 | 3/2009 |
| CN | 102666033 | 9/2012 |
| CN | 205043783 | 2/2016 |
| JP | S63318287 | 12/1988 |
| JP | 2006119995 | 5/2006 |
| JP | 2007001012 | 1/2007 |
| JP | 2017100200 | 6/2017 |

OTHER PUBLICATIONS

"Office Action of Taiwan Counterpart Application", issued on Oct. 17, 2022, with English translation thereof, op.1-10.
"Office Action of China Counterpart Application", issued on Apr. 22, 2023, with English translation thereof, pp. 1-14.
"Office Action of Taiwan Counterpart Application", issued on Mar. 2, 2023, with English translation thereof, pp. 1-13.

* cited by examiner

CONTROL DEVICE FOR INDUSTRIAL ROBOT

CROSS REFERENCE TO RELATED APPLICATION

The present invention claims priority under 35 U.S.C. § 119 to Japanese Application No. 2020-186501 filed Nov. 9, 2020, the entire content of which is incorporated herein by reference.

BACKGROUND

Field of the Invention

At least an embodiment of the present invention may relate to a control device for an industrial robot.

Description of the Related Documents

In Japanese Patent Laid-Open No. 2007-001012 (Patent Literature 1), an industrial robot is described which includes a plurality of safety devices for stopping the robot based on its operation. In the industrial robot, the safety devices are connected with each other in series and, among a plurality of the safety devices, whether activation of a certain safety device is outputted to a peripheral device or not is capable of being selected by freely connecting one end of a relay coil for operating a relay contact for performing an output to the peripheral device with any one of connecting points of the plurality of the safety devices. In a case that any one of the safety devices located on one side of a connecting point with which one end of the relay coil is connected is activated, the activation is outputted to the peripheral device and, in a case that any one of the safety devices located on the other side of the connecting point is activated, the activation is not outputted to the peripheral device.

In Japanese Patent Laid-Open No. 2017-100200 (Patent Literature 2), a robot control device configured to control a robot is described. The robot control device includes a load detection part which detects a load of a motor for driving each of joint shafts of the robot, a speed detection part which detects a shaft speed in each of the joint shafts of the robot, a stop cause identifying part which identifies a cause of occurrence of an emergency stop when the robot has stopped in an emergency, and a recording part which records a cause of occurrence of the emergency stop and a load of the motor or the shaft speed in association with each other.

In the industrial robot described in Patent Literature 1, a connection destination of a relay coil for detecting activation of a safety device can be changed as required. However, a connection destination of a relay coil is frequently changed and thus, work efficiency in a production site may be deteriorated. In the Patent Literature 2, a cause of occurrence of an emergency stop in an inside of the robot is identified, but an activating state of a safety device connected with the robot is not detected.

SUMMARY

In view of the problem described above, at least an embodiment of the present invention may advantageously provide a control device for an industrial robot which is capable of efficiently confirming which safety device is activated among safety devices provided for stopping the industrial robot.

According to at least an embodiment of the present invention, there may be provided:

(1) A control device for an industrial robot comprising: a plurality of types of safety devices which are capable of connecting with the control device, the plurality of the types of the safety devices being connected with a power source in series, wherein the safety device is configured to be capable of being manually switched between electric cutoff of a wiring path and resumption from the cutoff; detection circuits which are connected with respective output side terminals of the plurality of the types of the safety devices, each of the detection circuits detecting whether the output side terminal is in a first state that power is supplied from the power source or in a second state that power supply from the power source is stopped; and a control part configured to perform notification based on an output of the detection circuit.

According to the above-mentioned (1), a detection circuit is provided in each of the safety devices and thus, it can be determined that which of activating states of the safety devices should be preferentially confirmed based on outputs of the detection circuits. Work until a time when operation of the robot is resumed can be efficiently performed by notifying a user based on the above-mentioned determination.

(2) The control device for an industrial robot described in the above-mentioned (1), wherein, in a case that only one of the detection circuits outputs a detected result indicating the second state, the control part performs the notification which prompts confirmation of the safety device whose output side terminal is connected with the detection circuit indicating the second state.

According to the above-mentioned (2), in a case that only one of the detection circuits outputs a detected result indicating the second state, in other words, in a case that, among a plurality of the safety devices, only the device disposed on the most separated position from a power source is activated (wiring path is cut off), notification which prompts confirmation of the device is performed. Therefore, a user is not required to perform confirmations of all the safety devices and thus, efficiency of work such as safety confirmation can be enhanced.

(3) The control device for an industrial robot described in the above-mentioned (1) or (2), wherein, in a case that a plurality of the detection circuits outputs a detected result indicating the second state, the control part performs the notification which prompts confirmation of the safety device disposed on the most power source side among the safety devices whose output side terminals are connected with the plurality of the detection circuits indicating the second state.

According to the above-mentioned (3), in a case that a plurality of the detection circuits outputs a detected result indicating the second state, the control part performs the notification which prompts confirmation of the safety device disposed on the most power source side among the safety devices whose output side terminals are connected with the plurality of the detection circuits indicating the second state. For example, among the safety devices with which a plurality of the detection circuits are connected, even in a state that only the safety device on the most power source side is activated and other safety devices are not activated, the respective outputs of the plurality of the detection circuit indicate the second state. Even in this case, notification which prompts only confirmation of the safety device on the most power source side is first performed, and cutoff of a wiring path by the safety device is restored. Even if the safety device is restored, in a case that there is an output of a detection circuit indicating the second state, confirmation of the safety device connected with the detection circuit is prompted. As described above, necessity that a user performs confirmations of all of the safety devices corresponded to a plurality of the detection circuits can be reduced and thus, efficiency of work such as safety confirmation can be enhanced.

(4) The control device for an industrial robot described in the above-mentioned (1) or (2), wherein, in a case that a plurality of the detection circuits outputs a detected result indicating the second state, the control part performs the notification which prompts confirmations of the safety devices whose output side terminals are connected with the plurality of detection circuits indicating the second state.

According to the above-mentioned (4), for example, in a case that outputs of only two of three detection circuits indicate the second state, only notifications which prompt confirmations of the safety devices whose output side terminals are connected with the two detection circuits are performed. Therefore, a user is not required to perform confirmations of all of the safety devices corresponding to the three detection circuits and thus, efficiency of work such as safety confirmation can be enhanced.

(5) The control device for an industrial robot described in the above-mentioned (3) or (4), the plurality of the types of the safety devices comprises a first safety device provided in a safety fence surrounding the industrial robot, and a second safety device provided in a place different from the safety fence and a teaching operation terminal, and the second safety device is disposed on a power source side with respect to the first safety device.

According to the above-mentioned (5), the second safety device whose resuming operation by a user is easily forgotten is disposed on the power source side with respect to the first safety device whose resuming operation is hard to be forgotten. Therefore, for example, even in a case that both of the first safety device and the second safety device are activated, a user can be prompted to preferentially perform confirmation of the second safety device. As a result, the robot can be activated in a state that the second safety device is surely resumed and a time period until the robot is activated can be shortened.

(6) The control device for an industrial robot described in the above-mentioned (5), wherein the plurality of the types of the safety devices further comprises a third safety device provided in the teaching operation terminal, and the third safety device is disposed on the power source side with respect to the second safety device.

According to the above-mentioned (6), the third safety device provided in a teaching operation terminal whose use frequency is low is disposed on the most power source side. An output of the detection circuit connected with the third safety device frequently indicates the first state. If the third safety device whose use frequency is low is, for example, disposed at the most separated position from a power source, in a case that a safety device disposed on the most power source side becomes in a non-energized state, a state confirmation of the third safety device may be required. However, as described in the above-mentioned (6), when the third safety device is disposed on the power source side with respect to the first safety device and the second safety device, an inefficient state as described above can be prevented.

Effects of the Invention

According to the present invention, the control device for an industrial robot is capable of efficiently confirming which safety device is activated among safety devices provided for stopping the industrial robot.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

A robot system including a robot control device 200 in accordance with at least an embodiment of a control device of the present invention will be described below with reference to the accompanying drawings.

Configuration of Robot System

Figure 1:
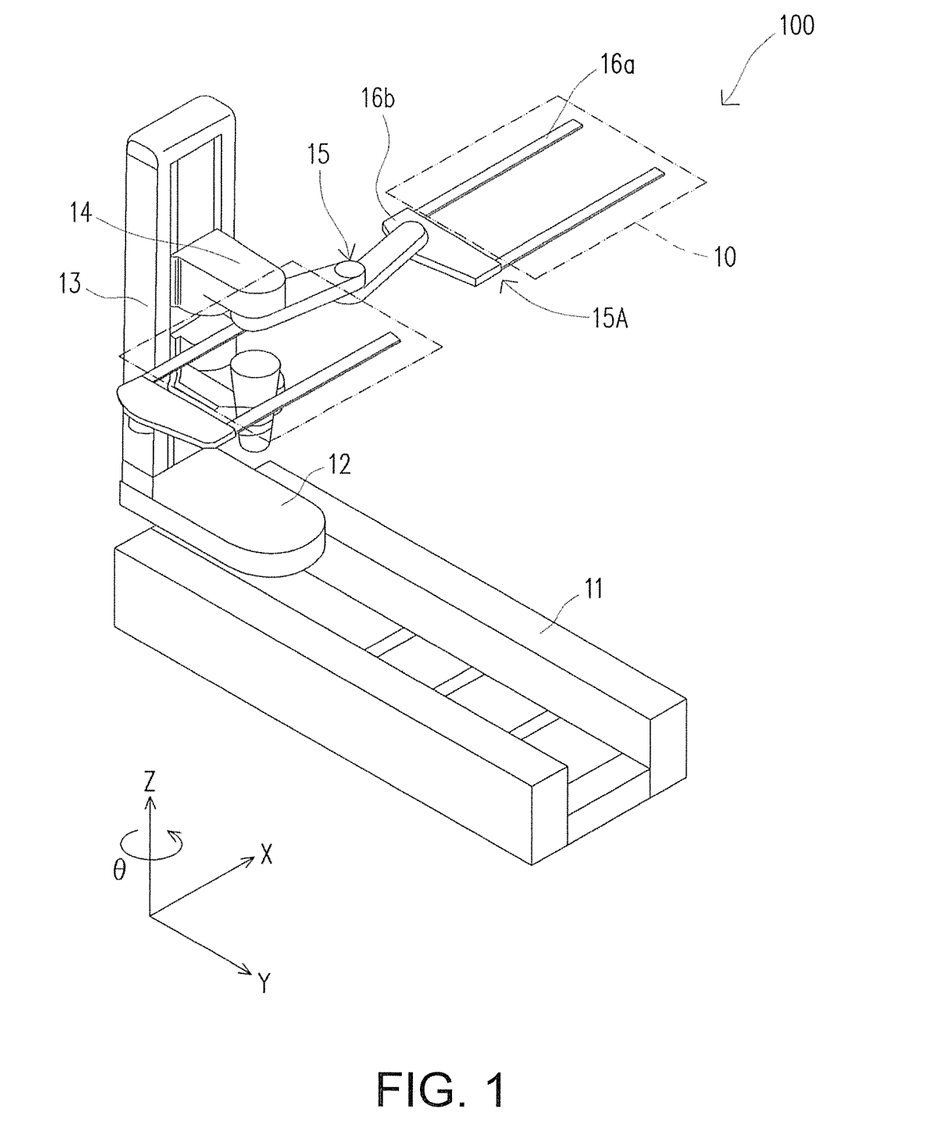
FIG. 1 is a view showing a schematic structure of an industrial robot included in a robot system.
Figure 2:
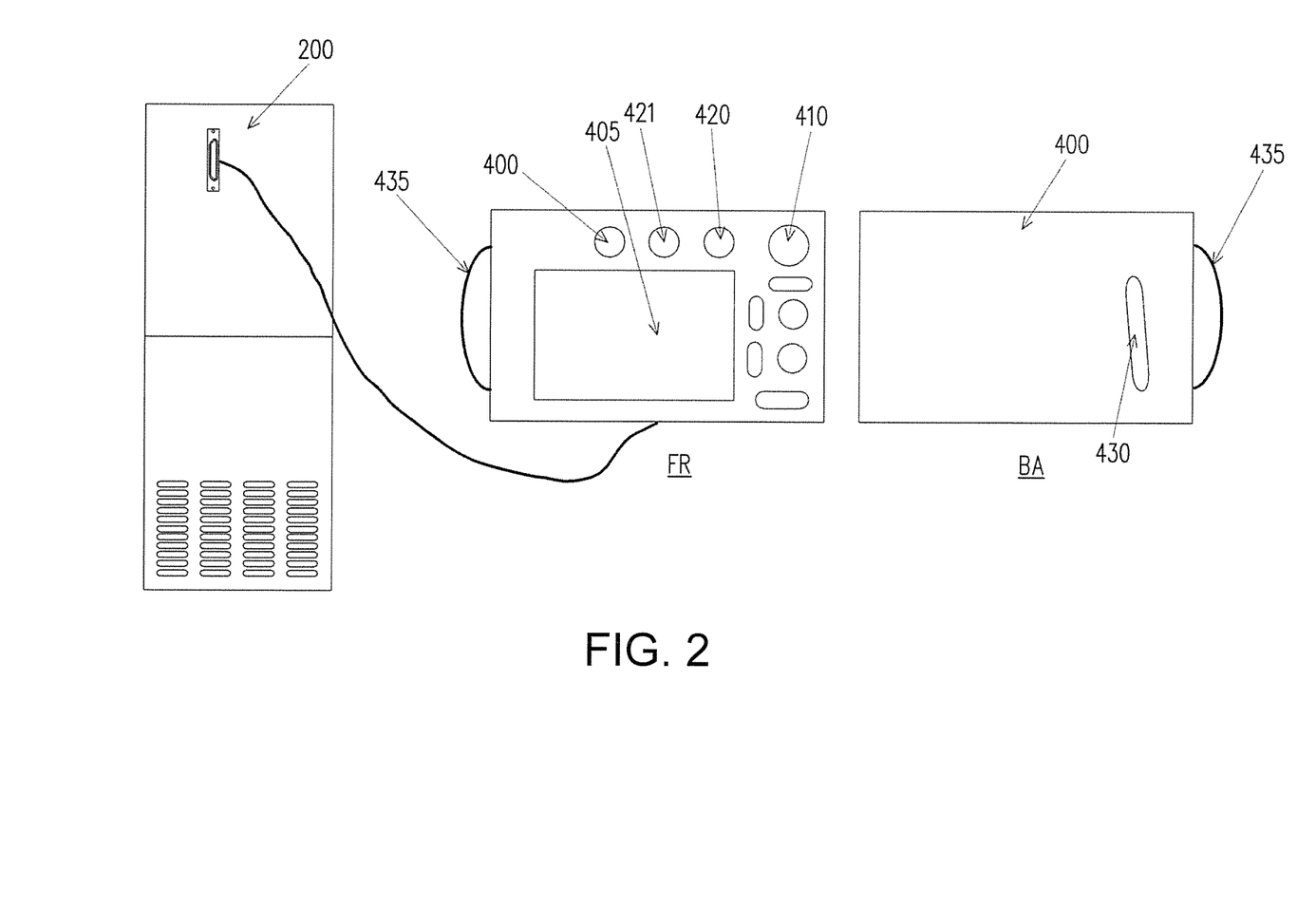
FIG. 2 is a view showing a schematic configuration of a robot control device and a teaching operation terminal included in a robot system.
Figure 3:
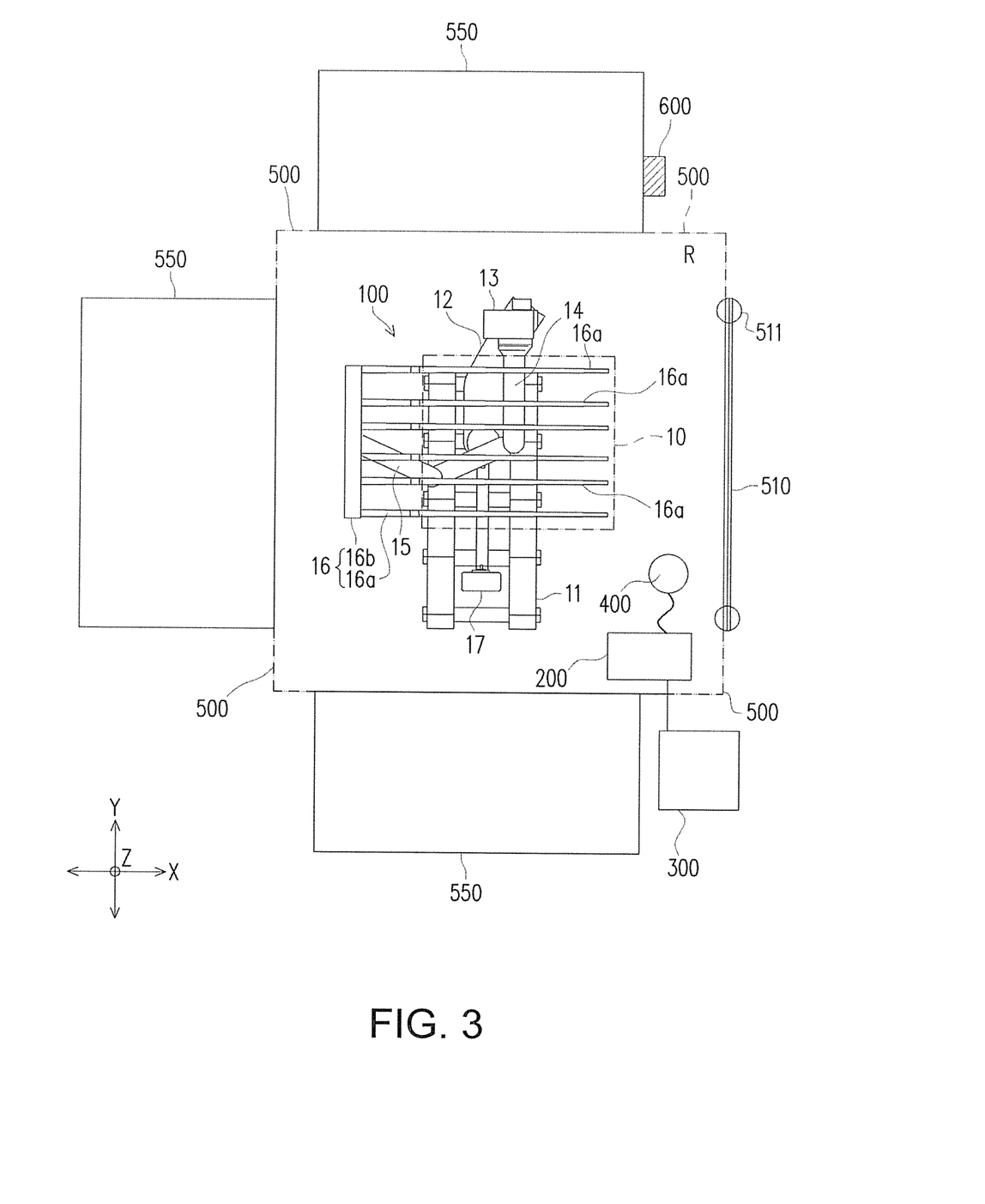
FIG. 3 is a schematic plan view showing an example of a layout of a production line (robot system) which includes the industrial robot in FIG. 1.

FIG. 1 is a view showing a schematic structure of an industrial robot 100 included in a robot system. FIG. 2 is a view showing a schematic configuration of a robot control device 200 connected with the industrial robot 100 in FIG. 1 and a teaching operation terminal 400 connected with the robot control device 200. The "FR" in FIG. 2 shows a front view of the teaching operation terminal 400 and the "BA" shows a rear view of the teaching operation terminal 400. FIG. 3 is a schematic plan view showing an example of a layout of a production line (robot system) which includes the industrial robot 100 in FIG. 1.

A robot system shown in FIG. 3 is structured of an industrial robot 100, a robot control device 200, a host apparatus 300, a teaching operation terminal (teaching pendant) 400, a safety fence 500 and manufacturing devices 550 of a liquid crystal display. Various devices and appliances in the robot system are electrically connected by a wire or wireless, or electrically connected by using a serial cable.

The industrial robot 100 is a conveyance robot for conveying a glass substrate 10 for a liquid crystal display (hereinafter, referred to as a "glass substrate 10") as a work-piece. The industrial robot 100 is structured of a base 11, a turnable unit 12, a column 13, a slider 14 (support member which supports an arm 15) and two arms 15. The arm 15 includes a hand 16 at its tip end. The hand 16 is provided with a fork part 16a and a hand base end part 16b, and a glass substrate 10 is placed on the fork part 16a and conveyed.

The turnable unit 12 is a base member on which the column 13 is stood up, and the turnable unit 12 is turnably arranged on the base 11. When the turnable unit 12 is turned around the "Z"-axis, the arm 15 and the hand 16 are turned to be capable of changing a direction of the hand 16. Further, the turnable unit 12 is capable of moving in the "Y"-axis direction on the base 11 in the drawing by a horizontal movement mechanism not shown. In addition, the slider 14 is structured so as to be capable of sliding up and down (slidable in the "Z"-axis direction in the drawing) on a side face of the column 13.

Two arms 15 move the hand 16 in a direction of taking out and supplying a glass substrate 10 by a rotation drive source not shown. In this case, the arms 15 are structured in a mechanism which performs an extending and contracting motion so that the hand 16 is linearly moved in a state that the hand 16 is directed in one direction between an extended position where the arms 15 are completely extended and a contracted position in a folded state. In other words, in this embodiment, the hand 16 reciprocates in the "X" direction in the drawing. Further, the hand 16 is operated so that a glass substrate 10 is accommodated in a manufacturing device 550 (see FIG. 3) located at an extended position, or that the glass substrate 10 is carried out to a contracted position.

As described above, the industrial robot 100 is a conveyance robot for conveying a glass substrate 10 and is a large-sized robot which is especially suitable for conveying a large-sized glass substrate 10 as a work-piece. The glass substrate 10 is, for example, in a substantially square shape whose one side is about 3 m and has considerable weight. Therefore, in a case of an emergency stop, there is a possibility that a dangerous operation such as dropping of the slider 14 or dashing of the arms 15 is occurred. In other words, when an operator enters a working area "R" in FIG. 3, it is very dangerous and thus, it is required to surely prevent such a dangerous operation.

The industrial robot 100 shown in FIG. 3 is a robot for conveying a further large-sized glass substrate 10 in comparison with the industrial robot 100 shown in FIG. 1, and this robot 100 is provided with six fork parts 16a according to a size of a glass substrate 10. Further, a turnable unit 12 of the industrial robot 100 shown in FIG. 3 includes a balancer 17 on an opposite side in a turning diameter with respect to a stood position of the column 13 so that weight at a time of turning is balanced.

This industrial robot 100 is installed in a place (working area "R") surrounded by a safety fence 500 and manufacturing devices 550 of liquid crystal displays.

The robot control device 200 is electrically connected with the industrial robot 100 by a wire such as a serial cable. The robot control device 200 servo-controls the industrial robot 100 which is driven and moved in respective axis directions of the "X"-axis, the "Y"-axis, the "Z"-axis and the "θ" axis in the drawing by servomotors (not shown). The robot control device 200 is disposed in an inside of the safety fence 500 in an example shown in FIG. 3. However, the robot control device 200 may be disposed on an outer side with respect to the safety fence 500, and the layout may be appropriately changed as required in the robot system.

The host apparatus 300 functions as a central control part of a line structured of several lanes. More specifically, the host apparatus 300 is configured as an external control panel which controls the entire production line (robot system) including the industrial robot 100 and the peripheral devices such as manufacturing devices 550. The host apparatus 300 is electrically connected with the robot control device 200 and is disposed on an outer side with respect to the safety fence 500. Further, the host apparatus 300 is electrically connected with the peripheral devices such as the manufacturing devices 550. The host apparatus 300 may include an emergency stop device such as an emergency stop switch for performing an emergency stop of the industrial robot 100.

The teaching operation terminal 400 is used for instructing positional information to the industrial robot 100 and is connected with the robot control device 200 by a wire such as a serial cable. The teaching operation terminal 400 includes a mode change-over switch 420 which generates a signal for switching between an automatic driving mode (Remote mode) and a teaching mode (Teach mode) of the industrial robot 100, a servo-on switch 421 which generates a signal enabling a drive current of a servomotor of the industrial robot 100 at a time of teaching in the teaching mode, an emergency stop switch 410 which generates an emergency stop signal corresponding to an emergency stop instruction, and an enable switch 430. The emergency stop switch 410 and the enable switch 430 are respectively emergency stop devices for performing an emergency stop of the industrial robot 100. In the teaching operation terminal 400, one of the emergency stop switch 410 and the enable switch 430 may be omitted. In the following descriptions, one or a plurality of the emergency stop devices provided in the teaching operation terminal 400 is generally described as a third safety device "SF3".

As shown in FIG. 2, the teaching operation terminal 400 is provided with an LCD display 405 at a center of its surface as an output part. The emergency stop switch 410 is provided on a right upper side with respect to the LCD display 405. Further, the mode change-over switch 420 and the servo-on switch 421 are provided in a switch group on an upper side with respect to the LCD display 405. Further, this switch group also includes various change-over switches for switching other operation modes. Further, a plurality of keys (switch) is provided on a right side with respect to the LCD display 405. These are switches for moving the industrial robot 100 from a current position to a predetermined target position for teaching. Specifically, a plurality of the keys is an "X"-axis jog feed operation key, a "Y"-axis jog feed operation key, a "Z"-axis jog feed operation key and the like which move the industrial robot 100 in the respective axis directions of the "X"-axis, the "Y"-axis, the "Z"-axis and the "θ" axis.

The enable switch 430 is provided on a rear face side of the teaching operation terminal 400. A gripping part 435 which is gripped by an operator is provided in a vicinity of the enable switch 430 (see FIG. 2). The enable switch 430 is a switch for avoiding danger which is turned "ON" when an operator lightly grips and is turned "OFF" when an operator releases his hand or grips strongly. It is desirable that the enable switch 430 is provided integrally with or close to the gripping part 435 so as to simultaneously press the enable switch 430 when an operator grips the gripping part 435 for operation. The enable switch 430 may be attached to a rear face of the gripping part of the teaching operation terminal 400 and is also referred to as a deadman switch.

In this embodiment, arrangement of the respective operation keys and the operation mode change-over switches and the like is one example, and an arrangement mode and an operation mode (for example, lever switch type) which are different from that in FIG. 2 may be adopted.

The safety fence 500 is provided to prevent an operator from carelessly entering in an operating range of the industrial robot 100 to secure safety of the operator. More specifically, as shown in FIG. 3, three manufacturing devices 550 for liquid crystal display as a peripheral device are installed so as to surround the industrial robot 100 at positions where parts of three among four sides of the safety fence 500 are opened. Further, a working area "R" of the industrial robot 100 is formed by the safety fence 500 and the manufacturing devices 550. In accordance with an embodiment of the present invention, instead of the manufacturing device 550, a conveyer device connected with another manufacturing line or a connection device therefor, or a substrate cassette unit in which a plurality of glass substrates 10 is accommodated in a laminated state may be disposed.

The safety fence 500 includes an opening/closing door 510 in which an interlock device 511 for detecting an opening/closing state of the opening/closing door 510 is attached. The interlock device 511 is an emergency stop device for performing an emergency stop of the industrial robot 100. In the robot system, in a case that an operator opens the opening/closing door 510 of the safety fence 500 in an automatic driving mode (Remote mode), the interlock device 511 is activated and the industrial robot 100 is emergency-stopped. The safety fence 500 may include a plurality of the opening/closing doors 510. In this case, each of the opening/closing doors 510 is attached with the interlock device 511. In the following descriptions, one or a plurality of the interlock devices 511 provided in the safety fence 500 is generally described as a first safety device "SF1".

In addition, the robot system includes an emergency stop instrument 600 as an emergency stop device, which generates an emergency stop signal for performing an emergency stop of the industrial robot 100 at a time of a dangerous situation and malfunction of the system, in a place different from the safety fence 500 and the teaching operation terminal 400. In an example shown in FIG. 3, the emergency stop instrument 600 is attached to the manufacturing device 550. The emergency stop instrument 600 may be, for example, attached to the host apparatus 300. The emergency stop instrument 600 is, for example, configured of an emergency stop button and its corresponding duplex switch and the like. Only one emergency stop instrument 600 may be provided in the robot system and, alternatively, a plurality of the emergency stop instruments 600 may be provided in the robot system. In the following descriptions, one or a plurality of the emergency stop instruments 600 included in the robot system is generally described as a second safety device "SF2". As described above, the robot system in this embodiment includes three types of the safety devices, i.e., the third safety device "SF3" provided in the teaching operation terminal 400, the first safety device "SF1" provided in the safety fence 500, and the second safety device "SF2" provided in a place different from the safety fence 500 and the teaching operation terminal 400.

Electric Configuration of Robot System

Figure 4:
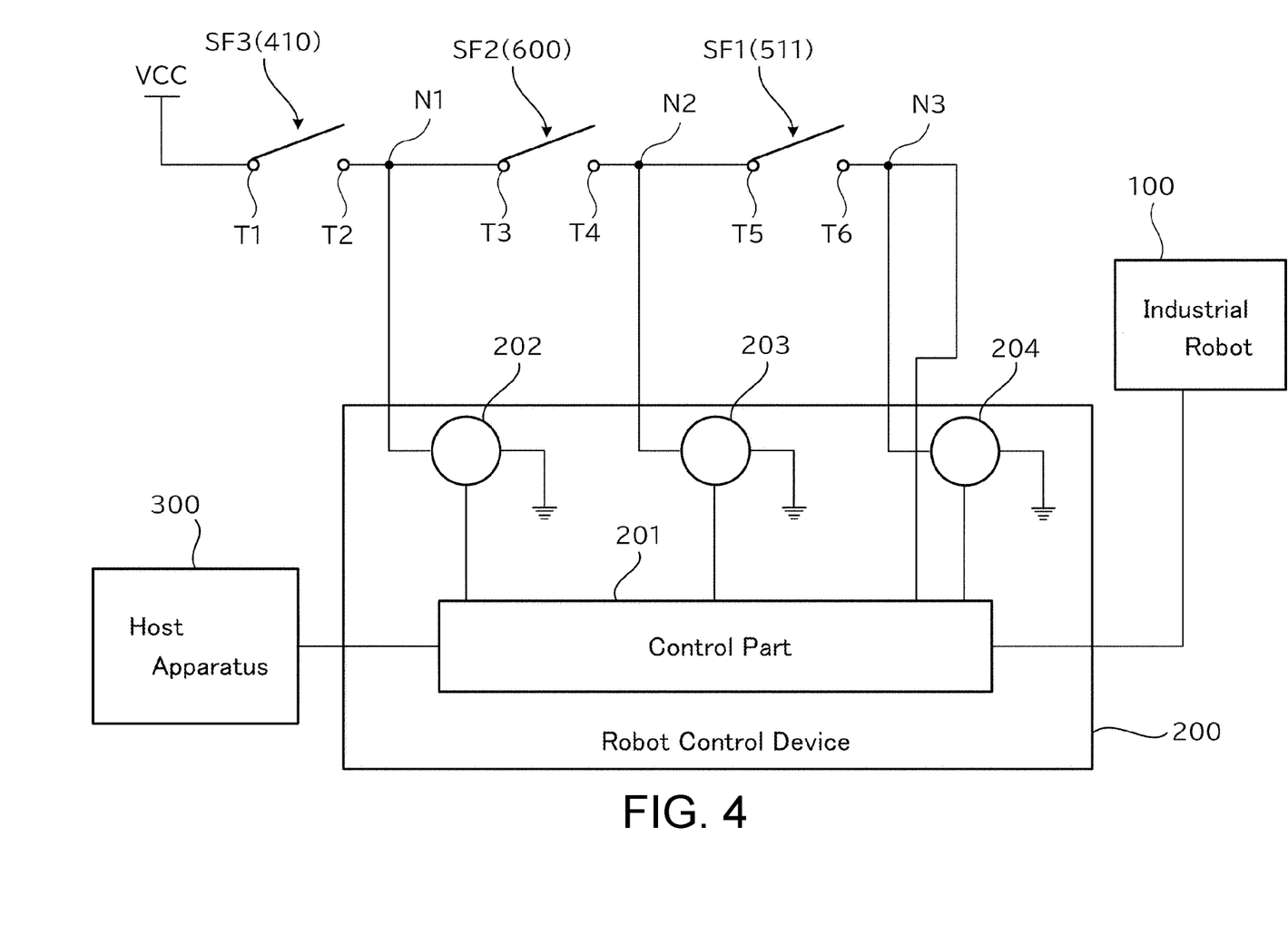
FIG. 4 is a schematic view showing an example of an electric configuration of the robot system shown in FIG. 3.

FIG. 4 is a schematic view showing an example of an electric configuration of the robot system shown in FIG. 3. FIG. 4 shows an example of a case that the third safety device "SF3" is configured of only the emergency stop switch 410, the second safety device "SF2" is configured of only one emergency stop instrument 600, and the first safety device "SF1" is configured of only one interlock device 511.

As shown in FIG. 4, each of the first safety device "SF1", the second safety device "SF2" and the third safety device "SF3" is configured of a "b"-contact type switch and they are connected in series with a power source "VCC". In each of the first safety device "SF1", the second safety device "SF2" and the third safety device "SF3", when an operation for emergency stop (button operations in the emergency stop switch 410 and the emergency stop instrument 600, and an opening operation of the opening/closing door 510 in the interlock device 511) of the industrial robot 100 is performed by a user, electric connection between an input side terminal and an output side terminal is cut off (switch is opened) and becomes a non-conductive state. Further, in each of the first safety device "SF1", the second safety device "SF2" and the third safety device "SF3", when a resuming operation (button operations in the emergency stop switch 410 and the emergency stop instrument 600, and a closing operation of the opening/closing door 510 in the interlock device 511) is performed by a user, electric connection between the input side terminal and the output side terminal is resumed (switch is closed) and becomes a conductive state. As described above, each of the first safety device "SF1", the second safety device "SF2" and the third safety device "SF3" is capable of being manually switched between electric cutoff (non-conductive state) of a wiring path and resumption (conductive state) from the cutoff.

A power source "VCC" is connected with an input side terminal "T1" of the third safety device "SF3". An output side terminal "T2" of the third safety device "SF3" is connected with an input side terminal "T3" of the second safety device "SF2". An output side terminal "T4" of the second safety device "SF2" is connected with an input side terminal "T5" of the first safety device "SF1". An output side terminal "T6" of the first safety device "SF1" is connected with the robot control device 200. The third safety device "SF3" is the safety device which is disposed on the most power source "VCC" side among three types of the safety devices. The first safety device "SF1" is the safety device which is disposed on the most opposite side to the power source "VCC" side (the most separated position from the power source "VCC" and the most robot control device 200 side) among three types of the safety devices.

The robot control device 200 includes a control part 201 configured to perform drive control of the industrial robot 100, emergency stop control of the industrial robot 100 and the like. The control part 201 includes a central control unit CPU (Central Processing Unit) and a storage unit such as a ROM (Read Only Memory) and RAM (Random Access Memory). The control part 201 drives and controls the industrial robot 100 by using instructions relating to a linear motion, a turning motion and respective axis operations in various coordinate systems based on operation programs of the industrial robot 100 and parameters for operation stored in the storage unit. A signal from the teaching operation terminal 400 is inputted for changing and amending an operation program of the industrial robot 100 and parameters for operation.

The robot control device 200 further includes a detection circuit 202 which is connected with a connection node "N1" between the third safety device "SF3" and the second safety device "SF2", a detection circuit 203 which is connected with a connection node "N2" between the second safety device "SF2" and the first safety device "SF1", and a detection circuit 204 which is connected with a connection node "N3" between the first safety device "SF1" and an earth terminal. Each of the detection circuit 202, the detection circuit 203 and the detection circuit 204 is structured of a relay circuit which is configured not to output a detection signal in a first state that power is supplied from the power source "VCC" and to output a detection signal in a second state that the power supply from the power source "VCC" is stopped. In other words, each of the detection circuit 202, the detection circuit 203 and the detection circuit 204 is a circuit which detects whether its state is the first state or the second state.

In accordance with an embodiment of the present invention, in a case that the enable switch 430 is further included in the third safety device "SF3", a series circuit of the enable switch 430 and the emergency stop switch 410 is connected between the power source "VCC" and the connection node "N1". As described above, in a case that the third safety device "SF3" includes a plurality of emergency stop devices, in the plurality of the emergency stop devices connected in series, an output side terminal of the emergency stop device connected on the most connection node "N1" side configures an output side terminal of the third safety device "SF3". In an example shown in FIG. 4, the output side terminal "T2" of the emergency stop switch 410 configures the output side terminal of the third safety device "SF3". In the following descriptions, in a case that at least one emergency stop device included in the third safety device "SF3" is in a non-conductive state, the third safety device "SF3" is defined as in a non-conductive state. Further, in a case that all emergency stop devices included in the third safety device "SF3" are in conductive states, the third safety device "SF3" is defined as in a conductive state.

In a case that a plurality of emergency stop instruments 600 is included in the second safety device "SF2", a series circuit of a plurality of the emergency stop instruments 600 is connected between the connection node "N1" and the connection node "N2". As described above, in a case that the second safety device "SF2" includes a plurality of emergency stop devices, in the plurality of the emergency stop devices connected in series, an output side terminal of the emergency stop device connected on the most connection node "N2" side configures an output side terminal of the second safety device "SF2". In the example shown in FIG. 4, the output side terminal "T4" of the emergency stop instrument 600 configures the output side terminal of the second safety device "SF2". In the following descriptions, in a case that at least one emergency stop device included in the second safety device "SF2" is in a non-conductive state, the second safety device "SF2" is defined as in a non-conductive state. Further, in a case that all emergency stop devices included in the second safety device "SF2" are in conductive states, the second safety device "SF2" is defined as in a conductive state.

In a case that a plurality of the interlock devices 511 is included in the first safety device "SF1", a series circuit of a plurality of the interlock devices 511 is connected between the connection node "N2" and the connection node "N3". As described above, in a case that the first safety device "SF1" includes a plurality of emergency stop devices, in the plurality of the emergency stop devices connected in series, an output side terminal of the emergency stop device connected on the most connection node "N3" side configures an output side terminal of the first safety device "SF1". In the example shown in FIG. 4, the output side terminal "T6" of the interlock device 511 configures the output side terminal of the first safety device "SF1". In the following descriptions, in a case that at least one emergency stop device included in the first safety device "SF1" is in a non-conductive state, the first safety device "SF1" is defined as in a non-conductive state. Further, in a case that all emergency stop devices included in the first safety device "SF1" are in conductive states, the first safety device "SF1" is defined as in a conductive state.

When the industrial robot 100 is to be operated, the respective safety devices are operated so that each of the first safety device "SF1", the second safety device "SF2" and the third safety device "SF3" is set in a conductive state. After that, when the third safety device "SF3" becomes in a non-conductive state during operation of the industrial robot 100, a wiring path between the power source "VCC" and the connection node "N1" is cut off. As a result, each of the detection circuit 202, the detection circuit 203 and the detection circuit 204 becomes in the second state that power supply from the power source "VCC" is stopped, and a detection signal is inputted to the control part 201 from each of the detection circuit 202, the detection circuit 203 and the detection circuit 204.

When the second safety device "SF2" is activated to become in a non-conductive state during operation of the industrial robot 100, the wiring path between the connection node "N1" and the connection node "N2" is cut off. As a result, each of the detection circuit 203 and the detection circuit 204 becomes in the second state that power supply from the power source "VCC" is stopped, and a detection signal is inputted to the control part 201 from each of the detection circuit 203 and the detection circuit 204.

When the first safety device "SF1" is activated to become in a non-conductive state during operation of the industrial robot 100, the wiring path between the connection node "N2" and the connection node "N3" is cut off. As a result, only the detection circuit 204 becomes in the second state that power supply from the power source "VCC" is stopped, and a detection signal is inputted to the control part 201 only from the detection circuit 204.

The control part 201 performs emergency stop control of the industrial robot 100 when a detection signal is inputted from at least one of the detection circuit 202, the detection circuit 203 and the detection circuit 204. In addition, the control part 201 controls to perform notification to indicate which safety device among the first safety device "SF1", the second safety device "SF2" and the third safety device "SF3" should be confirmed based on outputs of the detection circuit 202, the detection circuit 203 and the detection circuit 204. As a method of notification, for example, a method may be adopted that a control signal is transmitted to the host apparatus 300 to display a message on a display of the host apparatus 300 or that a lamp corresponding to the safety device among lamps provided on the host apparatus 300 for the respective safety devices is turned on. In a case that a display and lamps are provided in the robot control device 200, notification may be performed by utilizing these display and lamps.

Specific Examples of Notification Method

A specific example of notification method will be described below but the present invention is not limited to this method. First, patterns of output states of the detection circuits will be described below.

Pattern "A"

Pattern "A" is a pattern that a detection signal is outputted from only one of the detection circuit 202, the detection circuit 203 and the detection circuit 204. This pattern is generated when only the first safety device "SF1" located on the most robot control device 200 side is activated and has become in a non-conductive state.

Pattern "B"

Pattern "B" is a pattern that detection signals are outputted from two detection circuits 203 and 204 among the detection circuit 202, the detection circuit 203 and the detection circuit 204. This pattern is generated when only the second safety device "SF2" is activated and has become in a non-conductive state and, when only the first safety device "SF1" and the second safety device "SF2" are activated and have become in non-conductive states.

Pattern "C"

Pattern "C" is a pattern that detection signals are outputted from all of the detection circuit 202, the detection circuit 203 and the detection circuit 204. This pattern is generated when only the third safety device "SF3" is activated and has become in a non-conductive state, when only the third safety device "SF3" and the second safety device "SF2" are activated and have become in non-conductive states, when only the third safety device "SF3" and the first safety device "SF1" are activated and have become in non-conductive states, and when all of the first safety device "SF1", the second safety device "SF2" and the third safety device "SF3" are activated and have become in non-conductive states.

First Notification Control

In a case of the pattern "A", the control part 201 controls to perform or issue notification which prompts confirmation of the first safety device "SF1" whose output side terminal is connected with the detection circuit 204 outputting the detection signal. The user who has received the notification is determined that only the first safety device "SF1" is activated and, after having confirmed safety, the user operates so that the first safety device "SF1" is set in a conductive state. As a result, when no detection signal is outputted from all of the detection circuit 202, the detection circuit 203 and the detection circuit 204, the control part 201 resumes the operation of the industrial robot 100.

Second Notification Control

In a case of the pattern "B", for the detection circuit 203 and the detection circuit 204 outputting the detection signals, the control part 201 controls to perform or issue notification which prompts confirmation of the second safety device "SF2" whose output side terminal is connected with the detection circuit 203. The user who has received the notification is determined that the second safety device "SF2" is activated and, after having confirmed safety, the user operates so that the second safety device "SF2" is set in a conductive state. As a result of the operation, when no detection signal is outputted from all of the detection circuit 202, the detection circuit 203 and the detection circuit 204, the control part 201 resumes the operation of the industrial robot 100. On the other hand, as a result of the operation, in a case that an output state of the detection circuit becomes the pattern "A" (in other words, in a case that the first safety device "SF1" and the second safety device "SF2" have been activated and have become the pattern "B"), the control part 201 successively controls to perform notification which prompts confirmation of the first safety device "SF1". The user who has received the notification is determined that the first safety device "SF1" has been activated and, after having confirmed safety, the user operates so that the first safety device "SF1" is set in a conductive state. As a result, when no detection signal is outputted from all of the detection circuit 202, the detection circuit 203 and the detection circuit 204, the control part 201 resumes the operation of the industrial robot 100.

Modified Example of Second Notification Control

In a case of the pattern "B", the control part 201 controls to perform notifications which prompt confirmations of both of the second safety device "SF2" and the first safety device "SF1" whose output side terminals are respectively connected with the detection circuit 203 and the detection circuit 204 outputting the detection signals. The user who has received the notifications is determined that the first safety device "SF1" and the second safety device "SF2" are activated and, after having confirmed safety, the user operates so that the first safety device "SF1" and the second safety device "SF2" are set in conductive states. As a result of the operation, when no detection signal is outputted from all of the detection circuit 202, the detection circuit 203 and the detection circuit 204, the control part 201 resumes the operation of the industrial robot 100. The pattern "B" cannot distinguish a state that only the second safety device "SF2" is activated from a state that both of the second safety device "SF2" and the first safety device "SF1" are activated. Therefore, in the case of the pattern "B", when notification control of the modified embodiment is adopted, operation resumption of the industrial robot 100 may be efficiently performed in comparison with a case that notification is performed by two steps like the second notification control. On the other hand, in a state that only the second safety device "SF2" is activated, when the second notification control is adopted, a user is capable of omitting confirmation of the first safety device "SF1" and thus, efficient operation is enabled.

Third Notification Control

In a case of the pattern "C", among the detection circuit 202, the detection circuit 203 and the detection circuit 204 outputting the detection signals, the control part 201 controls to perform or issue notification which prompts confirmation of the third safety device "SF3" whose output side terminal is connected with the detection circuit 202.

Modified Example of Third Notification Control

In a case of the pattern "C", the control part 201 controls to perform notifications which prompt confirmations of the first safety device "SF1", the second safety device "SF2" and the third safety device "SF3".

Effect of Embodiments

According to the above-mentioned robot system, a detection circuit is provided in each of three types of safety devices and thus, it can be determined that which operating state of the safety device should be preferentially confirmed based on outputs of the detection circuits 202, 203 and 204. Work for the industrial robot 100 until a time when operation is resumed can be efficiently performed by notifying a user based on the determination.

Other Embodiments

The robot system in this embodiment includes three types of the safety devices. However, in the first safety device "SF1", the second safety device "SF2" and the third safety device "SF3", the third safety device "SF3" is not essential and may be omitted. This is because there is a user who does not utilize a teaching operation terminal 400.

Regarding arrangement of the first safety device "SF1", the second safety device "SF2" and the third safety device "SF3", as shown in FIG. 4, it is preferable to configure that, in the robot system, the third safety device "SF3" provided in the teaching operation terminal 400 and whose use frequency is low is disposed on the most power source "VCC" side, the first safety device "SF1" including the interlock device 511 which is hardest to forget its resuming operation is disposed on the most robot control device 200 side, and the second safety device "SF2" is disposed therebetween. However, the arrangement is not limited to this embodiment and may be changed depending on intention of a user. For example, the positions of the first safety device "SF1" and the second safety device "SF2" may be interchanged with each other.

The robot system in this embodiment includes three types of the safety devices. However, a device configured of a "b"-contact type switch prepared by a user other than the safety devices may be further added. In this case, for example, the device may be connected between the power source "VCC" and the third safety device "SF3", or may be connected between the third safety device "SF3" and the second safety device "SF2". Further, in this case, the robot control device 200 is further provided with a detection circuit which is connected with an output side terminal of this device. According to this structure, an operation state of a device other than the safety devices can be also confirmed.

In this embodiment, two hands 16 and two arms 15 are disposed so as to overlap with each other in an upper and lower direction. In other words, the industrial robot 100 in this embodiment is a double arm type robot. In accordance with an embodiment of the present invention, the industrial robot 100 may be a single arm type robot including one hand 16 and one arm 15. In addition, in this embodiment, a double arm type robot for conveying a glass substrate as a workpiece is described as an example, but the present invention may be applied to a robot for conveying a semiconductor wafer or the like. Further, the present invention is not limited to a robot system for conveying a glass substrate, and may be applied to a robot of another format and application, and may be applied to another industrial equipment. For example, the present invention may be applied to a robot system for conveying a semiconductor substrate.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A control device for an industrial robot comprising:
a plurality of types of safety devices which are capable of connecting with the control device, the plurality of the types of the safety devices being connected with a power source in series, wherein the safety device is configured to be capable of being manually switched between electric cutoff of a wiring path and resumption from the cutoff;
detection circuits which are connected with respective output side terminals of the plurality of the types of the safety devices, each of the detection circuits detecting whether the output side terminal is in a first state that power is supplied from the power source or in a second state that power supply from the power source is stopped; and
a control part configured to perform notification based on an output of the detection circuit.

2. The control device for an industrial robot according to claim 1, wherein, in a case that only one of the detection circuits outputs a detected result indicating the second state, the control part performs the notification which prompts confirmation of the safety device whose output side terminal is connected with the detection circuit indicating the second state.

3. The control device for an industrial robot according to claim 1, wherein, in a case that a plurality of the detection circuits outputs a detected result indicating the second state, the control part performs the notification which prompts confirmation of the safety device disposed on a side that closest to the power source among the safety devices whose output side terminals are connected with the plurality of the detection circuits indicating the second state.

4. The control device for an industrial robot according to claim 3, wherein
the plurality of the types of the safety devices comprises:
a first safety device provided in a safety fence surrounding the industrial robot; and
a second safety device provided in a place different from the safety fence and a teaching operation terminal, and
the second safety device is disposed on a power source side with respect to the first safety device.

5. The control device for an industrial robot according to claim 4, wherein
the plurality of the types of the safety devices further comprises a third safety device provided in the teaching operation terminal, and
the third safety device is disposed on the power source side with respect to the second safety device.

6. The control device for an industrial robot according to claim 1, wherein, in a case that a plurality of the detection circuits outputs a detected result indicating the second state, the control part performs the notification which prompts confirmations of the safety devices whose output side terminals are connected with the plurality of detection circuits indicating the second state.

7. The control device for an industrial robot according to claim 6, wherein
the plurality of the types of the safety devices comprises:
a first safety device provided in a safety fence surrounding the industrial robot; and
a second safety device provided in a place different from the safety fence and a teaching operation terminal, and
the second safety device is disposed on a power source side with respect to the first safety device.

8. The control device for an industrial robot according to claim 7, wherein
the plurality of the types of the safety devices further comprises a third safety device provided in the teaching operation terminal, and
the third safety device is disposed on the power source side with respect to the second safety device.

* * * * *